(12) United States Patent
Entsminger et al.

(10) Patent No.: US 12,471,953 B2
(45) Date of Patent: Nov. 18, 2025

(54) TISSUE GRAFT DELIVERY DEVICES AND USES THEREOF

(71) Applicant: LifeNet Health, Virginia Beach, VA (US)

(72) Inventors: Adam Entsminger, Virginia Beach, VA (US); Cheryl Berger, Virginia Beach, VA (US); Michael Masters, Virginia Beach, VA (US); Kevin Shores, Virginia Beach, VA (US); Erich Lohmann, Virginia Beach, VA (US); Jingsong Chen, Virginia Beach, VA (US)

(73) Assignee: LifeNet Health, Virginia Beach, VA (US)

( * ) Notice: Subject to any disclaimer, the term of this patent is extended or adjusted under 35 U.S.C. 154(b) by 247 days.

(21) Appl. No.: 18/020,546

(22) PCT Filed: Aug. 10, 2021

(86) PCT No.: PCT/US2021/045441
§ 371 (c)(1),
(2) Date: Feb. 9, 2023

(87) PCT Pub. No.: WO2022/035899
PCT Pub. Date: Feb. 17, 2022

(65) Prior Publication Data
US 2023/0301683 A1    Sep. 28, 2023

Related U.S. Application Data

(60) Provisional application No. 63/063,812, filed on Aug. 10, 2020.

(51) Int. Cl.
*A61B 17/34*   (2006.01)
*A61B 17/88*   (2006.01)
(Continued)

(52) U.S. Cl.
CPC ...... *A61B 17/3468* (2013.01); *A61B 17/8822* (2013.01); *A61F 2/4601* (2013.01);
(Continued)

(58) Field of Classification Search
CPC A61F 2/4601; A61B 17/8822; A61B 17/3468
See application file for complete search history.

(56) References Cited

U.S. PATENT DOCUMENTS 7,014,640 B2   3/2006   Kemppainen et al.
8,628,536 B2   1/2014   Walker et al.
(Continued)

FOREIGN PATENT DOCUMENTS

WO   2018232100 A1   12/2018

OTHER PUBLICATIONS

Extended European Search Report for Application No. EP 21856600.8, mailed May 8, 2024, 9 pages.
(Continued)

*Primary Examiner* — Si Ming Ku
(74) *Attorney, Agent, or Firm* — Matney Legal Group PLLC

(57) ABSTRACT

The present invention provides a cannula for delivering a tissue graft to a treatment site. The cannula comprises a distal end, a proximal end, a bore formed by an interior surface of the cannula, extending from the distal end to the proximal end and having a diameter, and a tissue graft inside the bore and in contact with the interior surface. The tissue graft may be released from the cannula at the distal end to the treatment site. The tissue graft may have a final loading pressure of 20-200 psi. Also provided is a delivery system comprising the cannula and a delivery device. Further provided are methods for delivering a tissue graft in a cannula to a treatment site and methods for preparing a cannula loaded with the tissue graft.

20 Claims, 9 Drawing Sheets

(51) Int. Cl.
*A61F 2/46* (2006.01)
*A61B 17/56* (2006.01)
*A61F 2/28* (2006.01)

(52) U.S. Cl.
CPC . *A61B 2017/564* (2013.01); *A61F 2002/2835* (2013.01); *A61F 2310/00359* (2013.01)

(56) References Cited

U.S. PATENT DOCUMENTS

| | | | |
|---|---|---|---|
| 9,265,524 B2 | 2/2016 | Derwin et al. | |
| 9,655,748 B2 | 5/2017 | Greenhaigh et al. | |
| 9,981,283 B2 | 5/2018 | Greter et al. | |
| 10,231,846 B2 | 3/2019 | Popejoy et al. | |
| 2007/0055283 A1* | 3/2007 | Scribner | A61B 17/8833 606/93 |
| 2007/0185496 A1 | 8/2007 | Beckman et al. | |
| 2010/0198140 A1* | 8/2010 | Lawson | A61B 17/7095 604/264 |
| 2011/0082424 A1* | 4/2011 | Barnhouse | A61B 17/8827 604/125 |
| 2012/0116515 A1 | 5/2012 | Semler et al. | |
| 2015/0112352 A1 | 4/2015 | Krause et al. | |
| 2020/0129309 A1* | 4/2020 | Greenhalgh | A61M 5/31 |

OTHER PUBLICATIONS

International Search Report and Written Opinion for International Application No. PCT/US21/45441, dated Nov. 17, 2021, 7 pages.
Kobryn et al., "Effects of Repeated Fatiguing Rhythmical Hand Work", Eur. J. Appl. Physiol., (1981) 47, pp. 271-279.
Peebles et al., "Filling 'gaps' in Strength Data for Design", Applied Ergonomics, 34 (2003) pp. 73-88.
International Preliminary Report on Patentability and Written Opinion for International Application No. PCT/US2021/045441, issued Feb. 7, 2023, 6 pages.

* cited by examiner

FIG. 11

```
┌─────────────────────────────────────────────────────────────────────────┐
│ Place a tissue backstop into the bore from the proximal end of the       │
│ cannula such that the tissue backstop occupies a portion of the bore     │
│ and a void is formed by the remaining portion of the bore.               │
└─────────────────────────────────────────────────────────────────────────┘
                                    ↓
┌─────────────────────────────────────────────────────────────────────────┐
│ Load a first tissue plug into the void from the distal end of the        │
│ cannula, and the first tissue plug has a cross-sectional diameter        │
│ smaller than the inner diameter of the cannula.                          │
└─────────────────────────────────────────────────────────────────────────┘
                                    ↓
┌─────────────────────────────────────────────────────────────────────────┐
│ Push the first tissue plug towards the proximal end of the void such     │
│ that the first tissue graft is in contact with the tissue backstop.      │
└─────────────────────────────────────────────────────────────────────────┘
                                    ↓
┌─────────────────────────────────────────────────────────────────────────┐
│ Load a second tissue plug into the void from the distal end, and the     │
│ second tissue plug has a cross-sectional diameter smaller than the       │
│ inner diameter of the cannula.                                           │
└─────────────────────────────────────────────────────────────────────────┘
                                    ↓
┌─────────────────────────────────────────────────────────────────────────┐
│ Push the second tissue plug towards the proximal end of the void such    │
│ that the second tissue graft is in contact with the first tissue plug.   │
└─────────────────────────────────────────────────────────────────────────┘
              ↓                                           ↓
┌──────────────────────────────────┐   ┌──────────────────────────────────┐
│ Load a third tissue plug into    │   │ The first tissue plug and the    │
│ the void from the distal end of  │   │ second tissue plug may form a    │
│ the cannula, such that the third │   │ tissue graft in the cannula.     │
│ tissue plug may have a sectional │   └──────────────────────────────────┘
│ area smaller than the inner      │
│ diameter of the cannula.         │
└──────────────────────────────────┘
                ↓
┌─────────────────────────────────────────────────────────────────────────┐
│ Push the third tissue plug towards the distal end such that the third    │
│ tissue plug is in contact with the second tissue plug.                   │
└─────────────────────────────────────────────────────────────────────────┘
                                    ↓
┌─────────────────────────────────────────────────────────────────────────┐
│ The first tissue plug, the second tissue plug, and the third tissue      │
│ plug may form a tissue graft in the opening space.                       │
└─────────────────────────────────────────────────────────────────────────┘
```

TISSUE GRAFT DELIVERY DEVICES AND USES THEREOF

CROSS-REFERENCE TO RELATED APPLICATIONS

This application is a U.S. National Phase Application of International Application No. PCT/US2021/045441, filed Aug. 10, 2021, which claims the benefit of U.S. Provisional Application No. 63/063,812, filed Aug. 10, 2020, the contents of each of which are incorporated herein by reference in their entireties for all purposes.

FIELD OF THE INVENTION

The invention relates generally to devices for delivering tissue grafts to treatment sites, especially in a minimum invasive surgery (MIS), and uses thereof.

BACKGROUND OF THE INVENTION

In recent years minimally invasive surgery (MIS) has been well developed, due to the innovation and advancement of surgical instruments and techniques. MIS refers to any procedure that is less invasive than open surgery. Assisted by video instruments and specialized retractors, surgeons can perform complex MIS surgical procedures such as lumbar discectomy, laminectomy, and intervertebral fusion. This often causes less harm to nearby muscles and other tissues. It can also lead to lower levels of blood loss, less pain, and faster recovery after surgery. To achieve a spinal fusion, surgeons need to implant bone grafts into the narrow intervertebral space through a funnel or a tubular device. The surgeons often need to load the bone graft into a funnel or tubular device on the back table in the operation room, which can be time consuming. Furthermore, the bone graft frequently jams in the device during the injection process which can be very challenging for the surgeons to overcome during the surgical procedure. Thus, it is very desirable to develop a product of a cannula pre-loaded with bone graft, which will minimize or eliminate jamming during the injection process.

SUMMARY OF THE INVENTION

The present invention relates to a cannula or delivery system for delivering a tissue graft to a treatment site, and uses thereof.

A cannula for delivering a tissue graft to a treatment site is provided. The cannula comprises a distal end, a proximal end, a bore and a tissue graft. The bore is formed by an interior surface of the cannula, extends from the distal end to the proximal end, and has an inner diameter. The tissue graft is inside the bore and in contact with the interior surface. The tissue graft is released from the cannula at the distal end to the treatment site. The tissue graft has a final loading pressure of 20-200 psi. The inner diameter may be 5-20 mm.

The tissue graft may be an allograft, autograft, xenograft or combination thereof. The tissue graft may comprise bone, cartilage, soft tissue, placental tissue, birth tissue, umbilical cord, vascular tissue, tendon, ligament, fascia, dermis, periosteum, adipose, or a combination thereof. The tissue graft may be in a form of particulates, putty, powder, gel, slurry, sponge, or a combination thereof. The tissue graft may be frozen, plasticized, cryopreserved or freeze dried.

The cannula may have a particulate density of 1.1-1.3 $g/cm^3$. The tissue graft may have a maximum extrusion force of less than 190 N. The cannula may be loaded with the tissue graft at a tissue density of 0.1-0.5 $g/cm^3$.

The tissue graft may be a bone graft. The cannula may comprise more than 5,000 viable bone cells or bone forming cells per $cm^3$. In one embodiment, the bone graft may comprise bone particulates having viable bone cells or bone forming cells, and the cannula may further comprise a cryopreservation solution in the bore.

The bone particulates may be nondemineralized bone chips selected from the group consisting of cortical bone chips, corticocancellous bone chips, cancellous bone chips, and combinations thereof. The volume ratio of the cryopreservation solution to the bone graft may be less than 2. In various aspects, the bone graft may include or exclude demineralized bone matrix (DBM).

In one embodiment according to the invention, the bone graft may comprise corticocancellous bone and demineralized ground cortical bone at a volume ratio from 2:1 to 3:1, and the corticocancellous bone may comprise viable bone cells and have a particle size range of 1-4 mm, and the demineralized cortical bone matrix may contain less than 4.6% (w/w) residual calcium and have a particulate size of 250-1000 μm.

In another embodiment, the graft includes demineralized ground cortical bone and nondemineralized bone chips comprising cortical, corticocancellous, cancellous, and combinations thereof, wherein the chips include viable bone-forming cells. The cannula may further comprise a cryoprotectant, and the tissue graft in the cannula may be cryopreserved. The ground cortical bone may be free of foreign particles. At least 80% of the viable bone cells may remain viable after the tissue graft is stored in the cannula for at least 1 day.

The cannula may be a syringe cannula. The treatment site may be in a spine, dental, foot, jaw, ankle, limb bone or joint.

A system for delivering a tissue graft to a treatment site is also provided. The system comprises the cannula of the present invention, and a delivery device according to the principles of the invention. In one embodiment, the delivery device comprises a push rod and a push handler where the push rod is in contact with the tissue graft and on the opposite side of the tissue graft from the distal end. The push handler forces the push rod to push the tissue graft out of the cannula at the distal end to the treatment site. In other words, the push handler may be employed to force the push rod to expel the tissue graft out of the cannula at the distal end to the treatment site. The delivery device may provide a mechanical advantage of 1 to 5.5.

A method for delivering a tissue graft to a treatment site is further provided. In one aspect of the invention, a delivery method comprises connecting the cannula of the present invention with a delivery device. The delivery device may include a push rod. The delivery method also comprises contacting the push rod with the tissue graft, and in one example, the push rod is on the opposite side of the tissue graft from the distal end. The method further comprises forcing the push rod in the contacting step towards the distal end such that the push rod pushes the tissue graft out of the cannula at the distal end to the treatment site. The push rod may push the tissue graft at a pressure of no more than 4,000 psi in the forcing step.

In one aspect, a preparation method comprises placing a tissue backstop into the bore from the proximal end of the cannula such that the tissue backstop occupies a portion of the bore and a void is formed by the remaining portion of the bore. A first tissue plug may be loaded into the void from the distal end of the cannula, wherein the first tissue plug may have a cross-sectional diameter smaller than the inner diameter of the cannula. The preparation method further comprises pushing the first tissue plug towards the proximal end of the void such that the first tissue graft is in contact with the tissue backstop. In some examples, the preparation method may further include loading a second tissue plug into the void from the distal end, and, in some aspects, the second tissue plug may also have a cross-sectional diameter smaller than the inner diameter of the cannula. The second tissue plug may be pushed towards the proximal end of the void such that the second tissue graft contacts the first tissue plug. The first tissue plug and the second tissue plug may together form the tissue graft in the cannula.

In other examples, the preparation method may further comprise loading a third tissue plug into the void from the distal end, and the third tissue plug may have a cross-sectional diameter smaller than the inner diameter of the cannula. In this example, the preparation method may further include pushing the third tissue plug towards the proximal end of the void such that the third tissue plug is in contact with the second tissue plug, and the first tissue plug, the second tissue plug and the third tissue plug may together form the tissue graft in the cannula.

The preparation method may further comprise preparing each of the first tissue plug and the second tissue plug in a cylindrical chamber of a loading device, and in certain embodiments the cylindrical chamber has a cross-sectional diameter smaller than the inner diameter of the cannula.

The preparation method may further comprise pressing the first tissue into the first tissue plug in the cylindrical chamber. The method may further comprise pressing the second tissue into the second tissue plug in the cylindrical chamber in other embodiments.

In one embodiment, the loading device may comprise a first component having a first opening and a second component having a second opening, wherein the chamber is formed by mating the first opening and the second opening. Multiple components, such as three or more, may be constructed to create a chamber for the loading device that may be used to form a tissue plug that may be loaded in a cannula according to the invention.

The chamber may have a circular cross-section and, in some two component designs the components contribute equally to the cross-section and, in other designs, one component forms a greater portion of the cross-section. In one example, the first opening contributes to 70-80% of the circular cross-section, and the second opening contributes to the remaining circular cross-section. The chamber may have a surface finish of no more than 32 microinches root mean square (RMS).

BRIEF DESCRIPTION OF THE DRAWINGS

FIG. 11 is a flow diagram showing another embodiment of a method of preparing a cannula according to an embodiment of the invention.

DETAILED DESCRIPTION OF THE INVENTION

Figure 1:
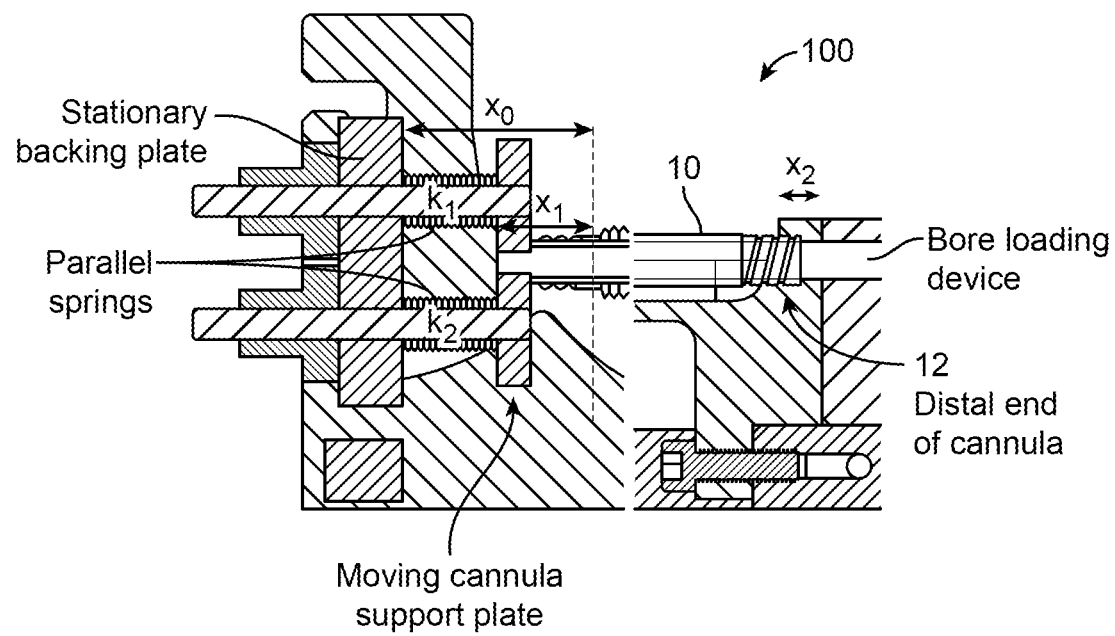
FIG. 1 illustrates a partial and broken cross-section view of a loading device and the variables associated with calculating the spring force restraining a cannula. According to the figure, $k_1$, $k_2$ are the spring constants (lb/in), $x_0$ is the uncompressed spring length (in)., $x_1$ is the compression distance caused by cannula (in) and $x_2$ is the minimum compression distance to remove cannula (in).

The present invention provides a cannula or delivery system for delivering a tissue graft to a treatment site as well as uses thereof, especially in a minimum invasive surgery (MIS). The invention is based on the inventors' surprising discovery of a novel semi-automatic bone particulate loading device 100 and a novel method capable of controlling a loading density and extrusion force of a loaded cannula 10. The inventors have discovered that loading a tissue plug into a cannula 10 from the distal end 12 minimizes friction effects and compression of the resulting tissue graft in the cannula 10 because the travel distance of the tissue plug is minimized during loading. The inventors have also unexpectedly discovered that a cannula 10 loaded with bone cell particulates, such as bone chips, optionally with or without demineralized bone matrix (DBM), maintains viable bone cells and cell activities while providing improved surgical procedures and outcomes. The newly discovered MIS allograft delivery device provides further enhanced new bone formation, reduced extrusion resistance, higher allograft yield per donor, and lower cost of goods sold (COGS).

The term "cannula" used herein refers to a thin tube used in a surgery for delivering a substance to a treatment site in a subject. The cannula 10 has an exterior surface 14 and an interior surface 16. The exterior surface 14 defines the external diameter of the cannula. The interior surface 16 forms a bore 18 extending along the axis of the cannula and defines an inner diameter. The bore 18 may be a cylinder.

The term "tissue graft" used herein refers to a tissue to be transplanted surgically into a subject at a treatment site. The tissue graft may be prepared from any tissue.

The term "treatment site" used herein refers to a site of defect in the body of a subject in need for treatment. The treatment site may be on the surface of the body or in a body cavity.

The term "constant diameter" used herein refers to the diameter of an elongated object along its axis having a variation no more than about 1%, 2%, 3%, 4%, 5%, 6%, 7%, 8%, 9% or 10%. For example, a cannula may have a constant inner diameter.

The term "delivery device" used herein refers to an apparatus for extruding a tissue graft from a cannula to a treatment site. The delivery device may comprise two or more components. The delivery device 20 may comprise a connector 22 with threaded ends for easy assembly with and disassembly from the cannula 10. A delivery system may be formed by a delivery device and a cannula 10.

The term "push rod" used herein refers to a component of a delivery device, which may be actuated directly or indirectly through one or more mechanisms to extrude a tissue graft from the cannula. The push rod 24 may be stiff or flexible, and may take on any shape, for example, a cylinder. The push rod 24 may have features that allow actuation of less than the full length of the push rod 24 or cannula 10.

The term "push handler" 26 used herein refers to a component of a delivery device 20, which may restrain a cannula 10 and may contain one or more mechanisms to actuate the push rod to extrude a tissue graft from the cannula.

The term "stroke" used herein refers to one cycle of actuation of a push rod, where the push rod 24 may advance from the proximal end 28 of the cannula 10 towards the distal end 12 of the cannula 10 at any increment of distance.

The term "mechanical advantage" used herein refers to a force amplification achieved by a delivery device using its components via one or more mechanisms. The components may include a push rod, push handle, lever, gear, chain drive, belt drive, pneumatic, hydraulic or a combination thereof. For example, the mechanical advantage developed in a delivery device may be generated through a lever mechanism, which is pinned in the middle for rotation with a longer push handle on one side and a shorter push rod advancement mechanism on the other side.

The term "maximum extrusion force" used herein refers to the maximum force applied to actuate or engage a delivery device to extrude a tissue graft 30 at any time during extrusion of the tissue graft 30 from the cannula 10. The maximum extrusion force applied to the delivery device 20 may introduce a mechanical advantage, such that the force experienced by the tissue graft 30 from the push rod 24 is higher than the applied maximum extrusion force. The extrusion of a tissue graft 30 may be completed over one or more strokes of the push rod 24. The maximum extrusion force should not exceed an upper limit whereby the tissue graft 30 remains in its desirable condition and shape and remains in a desired treatment site after being expelled from the cannula to the treatment site.

The term "tissue plug" 30 or "tissue column" 30 used herein interchangeably and refer to an aliquot of a tissue that is prepared or preformed in a predetermined size and shape. One, two, or more tissue plugs or tissue columns may be used for forming a tissue graft 30. The tissue plug or tissue column may be prepared by conventional techniques.

The term "loading device" used herein refers to an apparatus used to load a tissue plug into a cannula.

The term "void" refers to a portion of a bore in a cannula intended to be filled with a tissue graft. An empty cannula may be placed in a loading device, and a physical tissue backstop 32 may be placed into the bore from its proximal end to prevent a tissue plug from going past the tissue backstop. The physical tissue backstop may be a dowel with a slightly smaller diameter than the inner diameter of the cannula. The tissue backstop 32 allows air and liquid to pass, but not the tissue plug, and creates a defined void volume to be filled by a tissue plug while preventing buildup of pressure as the tissue plug is pushed into the cannula.

The term "tissue density" used herein refers to the mass of a tissue graft in a cannula divided by the void volume, where the tissue graft may be in any form.

The term "particulate density" used herein refers to the mass of a tissue graft in the cannula divided by the void volume, where the tissue graft is in the form of particulates.

The term "final compression force" used herein refers to the force applied to one end of a tissue plug in a cannula towards the distal end of the cannula during loading, either directly or indirectly by a loading device, and the tissue plug has in turn translated the force to the other end of the tissue plug against the tissue backstop or another tissue plug previously loaded into of the void. The final compression force may be used to establish a consistent tissue graft volume and density while maintaining the extrusion force not exceeding the maximum extrusion force.

The term "final loading pressure" used herein refers to the final compression force transmitted to a tissue plug inside a cannula divided by the cross-sectional area defined by the inner diameter of the cannula.

The term "surface roughness" used herein refers to a quantified deviation of a surface from its ideal form and can be assessed through measurements in combination with the equation below:

$$x_{RMS} = \sqrt{\frac{1}{n}(x_1^2 + x_2^2 + \ldots + x_n^2)}. \tag{1}$$

where x is a measurement of the surface height and n is the number of measurements taken. The surface roughness may be measured by using a contact profilometer.

A cannula 10 for delivering a tissue graft to a treatment site is provided. The cannula comprises a distal end 12, a proximal end 28, a bore 18, and a tissue graft 30. The bore 18 is formed by an interior surface 16 of the cannula, extends from the distal end 12 to the proximal end 28, and has an inner diameter, which may be constant. The tissue graft 30 is inside the bore 18 and in contact with the interior surface 16. The tissue graft 30 is released from the cannula 10 at the distal end 12 to the treatment site. The tissue graft 30 has a predetermined final loading pressure, defined by a final compression force on the tissue inside the cannula 10 divided by the cannula bore 18 cross-sectional area. The predetermined final loading pressure may be about 1-1,000, 10-1,000, 20-1,000, 50-1,000, 100-1,000, 1-500, 10-500, 20-500, 50-500, 100-500, 1-400, 10-400, 20-400, 50-400, 100-400, 1-300, 10-300, 20-300, 50-300, 100-300, 1-200, 10-200, 20-200, 30-200, 40-200, 50-200, 60-200, 70-200, 80-200, 90-200, 100-200, 110-200, 120-200, 130-200, 140-200, 150-200, 20-150, 30-150, 40-150, 50-150, 60-150, 70-150, 80-150, 90-150, 100-150, 110-150, 120-150, 130-150, 140-150, 20-140, 30-140, 40-140, 50-140, 60-140, 70-140, 80-140, 90-140, 100-140, 110-140, 120-140, 130-140, 20-130, 30-130, 40-130, 50-130, 60-130, 70-130, 80-130, 90-130, 100-130, 110-130, 120-130, 20-120, 30-120, 40-120, 50-120, 60-120, 70-120, 80-120, 90-120, 100-120, 110-120, 20-110, 30-110, 40-110, 50-110, 60-110, 70-110, 80-110, 90-110, 100-110, 20-100, 30-100, 40-100, 50-100, 60-100, 70-100, 80-100, 90-100, 20-90, 30-90, 40-90, 50-90, 60-90, 70-90, 80-90, 20-80, 30-80, 40-80, 50-80, 60-80, 70-80, 20-70, 30-70, 40-70, 50-70, 60-70, 20-60, 30-60, 40-60, 50-60, 20-50, 30-50, 40-50, 20-40 or 30-40 psi. For example, the predetermined final loading pressure may be 63-111 psi.

The cannula 10 may be used with a delivery device 20 for delivering a tissue graft in a surgery, for example, a minimum invasive surgery, in which the treatment site may have a small incision.

A cannula 10 may be selected for its outer diameter (OD) (e.g., 8 mm) to be about the maximum desired to fit inside the annulotomy of the treatment site, for example, between the vertebrae. The OD of the cannula may be no more than 30, 25, 20, 15, 14, 13, 12, 11, 10, 9, 8, 7, 6 or 5 mm. The selection of the inner diameter (ID) (e.g., 6 mm) may be driven by structural factors and manufacturing limitations for wall thickness. A larger ID is better for delivering a graft material during expression from the cannula, or while the graft material is coming out of the cannula (e.g., being extruded), but the limit is fitting the cannula (OD) into the surgical site (such as the intervertebral disk space). The ID of the cannula may be 1-25, 1-20, 1-15, 1-10, 1-9, 1-8, 1-7, 1-6, 1-5, 2-25, 2-20, 2-15, 2-10, 2-9, 2-8, 2-7, 2-6, 2-5, 3-25, 3-20, 3-15, 3-10, 3-9, 3-8, 3-7, 3-6, 3-5, 4-25, 4-20, 4-15, 4-10, 4-9, 4-8, 4-7, 4-6, 4-5, 5-25, 5-20, 5-15, 5-10, 5-9, 5-8, 5-7, or 5-6 mm.

The cannula 10 may have threaded ends allowing a cap to be easily assembled and disassembled at either end to help keep the tissue graft in the cannula. The delivery device may contain female threading to accept the threaded end of the cannula, an interface to support and direct the delivery device and cannula, such as a handle, and a mechanism for actuation to extrude a tissue graft from a cannula, such as a trigger that acts a lever to advance a push rod.

The tissue graft 30 may be an allograft, autograft, xenograft or a combination thereof. The tissue graft may comprise bone, cartilage, soft tissue, placental tissue, birth tissue, umbilical cord, vascular tissue, tendon, ligament, fascia, dermis, periosteum, adipose, or a combination thereof.

The tissue graft 30 may be in a form of particulates, putty, powder, gel, slurry, sponge, or a combination thereof. The tissue graft may be frozen, plasticized, cryopreserved or freeze dried.

The cannula may have a particulate density of 0.1-10, 0.1-5, 0.1-1, 0.1-0.5, 0.5-10, 0.5-5, 0.5-1, 1-10, 1-5, 1-4, 1-3, 1-2, 1-1.5, 1-1.4, 1-1.3, 1-1.2, 1-1.1, 1.1-5, 1.1-4, 1.1-3, 1.1-2, 1.1-1.5, 1.1-1.4, 1.1-1.3, 1.1-1.2, or 5-10 g/cm³, less than 10, 5, 1, 0.5 or 0.1 g/cm³, or no more than 0.5, 1, 5 or 10 g/cm³. In one embodiment, the particulate density may be less than 5.0 g/cm³. In another embodiment, the particulate density may be 1.1-1.3 g/cm³.

The tissue graft may have a maximum extrusion force of 100-300, 100-250, 100-200, 100-150, 150-300, 150-250, 150-200, 160-200, 160-190, 160-180, 160-170, 170-200, 170-190, 170-180, 180-200, 180-190, 190-200, 200-300, 200-250 or 250-300 N, less than 150, 160, 170, 180, 190, 200, 250 or 300 N, or more than 100, 150, 160, 170, 180, 190, 200, 250 or 300 N. In one embodiment, the maximum extrusion force may be 180-190 N (e.g., 187 N) or 150-160 N (e.g., 152 N).

The cannula may be loaded with a tissue density at 0.01-20, 0.01-15, 0.01-10, 0.01-5, 0.01-1, 0.01-0.5, 0.01-0.1, 0.01-0.05, 0.05-20, 0.05-15, 0.05-10, 0.05-5, 0.05-1, 0.05-0.5, 0.05-0.1, 0.1-20, 0.1-15, 0.1-10, 0.1-5, 0.1-1, 0.1-0.5, 0.2-20, 0.2-15, 0.2-10, 0.2-5, 0.2-1, 0.2-0.5, 0.5-20, 0.5-15, 0.5-10, 0.5-5, 0.5-1, 1-20, 1-15, 1-10, 1-5, 1-4, 1-3, 1-2, 1-1.5, 1-1.4, 1-1.3, 1-1.2, 1-1.1, 5-20, 5-15, 5-10, 10-20, 10-15, or 15-20 g/cm³, at least 0.01, 0.05, 0.1, 0.2, 0.5, 1, 5, 10 or 15 g/cm³, or no more than 0.05, 0.1, 0.2, 0.5, 1, 5, 10, 15 or 20 g/cm³.

The cannula may comprise viable cells. There may be more than 1,000, 5,000, 10,000, 11,000, 12,000, 13,000, 14,000, 15,000, 16,000, 17,000, 18,000, 19,000, 20,000, 25,000, 30,000, 50,000, 100,000, 200,000, 300,000, 400,000, 500,000 or 1,000,000 viable cells/cm³ of the tissue graft in the cannula. At least 40, 50, 60, 70, 80, 90, 95 or 99% of the viable cells remain viable after the cannula is stored for a predetermined time, for example, at least 1, 2, 3, 4, 5, 6, or 7 days, 1, 2, 3, 4, 5, 6, 7, or 8 weeks, or 1, 2, 3, 4, 5, 6, 9, 12, 18 or 24 months. The viable cells may be naturally occurring cells in the tissue from which the tissue graft is prepared, with or without culture. The viable cells may be seeded to the tissue graft, with or without further culture expansion. The viable cells may be differentiated cells, progenitor cells or stem cells from the tissue. The viable cells may be progenitor cells or differentiated cells derived from stem cells from the tissue.

The tissue graft may be a bone graft. The bone graft may comprise viable bone cells or bone forming cells. There may be more than 1,000, 5,000, 10,000, 11,000, 12,000, 13,000, 14,000, 15,000, 16,000, 17,000, 18,000, 19,000, 20,000, 25,000, 30,000, 50,000, 100,000, 200,000, 300,000, 400,000, 500,000 or 1,000,000 viable bone cells or bone forming cells per cm³ of the bone graft. In one embodiment, the bone graft may comprise more than 16,000 viable bone cells or bone forming cells. At least 40, 50, 60, 70, 80, 90, 95 or 99% of the viable bone cells or bone forming cells remain viable after the cannula is stored for a predetermined time, for example, at least 1, 2, 3, 4, 5, 6, or 7 days, 1, 2, 3, 4, 5, 6, 7, or 8 weeks, or 1, 2, 3, 4, 5, 6, 9, 12, 18 or 24 months. The viable cells may be naturally occurring cells in the bone from which the bone graft is prepared, with or without being cultured. The viable cells may be seeded to the bone graft, with or without further culture expansion. The viable cells may be differentiated cells, progenitor cells or stem cells from the tissue. The viable cells may be progenitor cells or differentiated cells derived from stem cells from the bone.

The cannula may further comprise the cryopreservation solution in the amount of 0.5-2.5, 0.5-2, 0.5-1.5, 0.5-1, 1-2.5, 1-2, 1-1.5, 1.5-2.5, 1.5-2 or 2-2.5 cc, or about 10-90, 10-80, 10-70, 10-60, 10-50, 10-40, 10-30, 10-20, 20-90, 20-80, 20-70, 20-60, 20-50, 20-40, 20-30, 30-90, 30-80, 30-70, 30-60, 30-50, 40-90, 40-80, 40-70, 40-60, 40-50, 50-90, 50-80, 50-70, 50-60, 60-90, 60-80, 60-70, 70-90, 70-80 or 80-90% by volume, based on the total volume of the void in the cannula. The tissue may be saturated with the cryopreservation solution prior to loading. The volume ratio of the cryopreservation solution to the tissue graft may be 0.1-10, 0.1-5, 0.1-1, 0.1-0.5, 0.5-10, 0.5-5, 0.5-1, 1-10, 1-5, or 5-10, less than 0.1, 0.5, 1, 5 or 10, or more than 0.1, 0.5, 1, 5 or 10.

The bone graft may comprise bone particulates. The bone particulates may have viable bone cells. The bone particulates may be nondemineralized bone chips, which may be cortical bone chips, corticocancellous bone chips, cancellous bone chips, or a combination thereof. The volume ratio of the cryopreservation solution to the bone graft, for example, bone particulates, may be 0.1-10, 0.1-5, 0.1-1, 0.1-0.5, 0.5-10, 0.5-5, 0.5-1, 1-10, 1-5, or 5-10, less than 0.1, 0.5, 1, 5 or 10, or more than 0.1, 0.5, 1, 5 or 10.

The tissue graft may be an allograft. The allograft may be a bone allograft formulated from morselized nondemineralized corticocancellous bone, cortical bone, cancellous bone, or mixtures thereof containing native lineage committed bone cells (live bone) and demineralized cortical bone matrix (DBM) to promote new bone formation. Other allografts may contain native growth factors that promote healing and provide clinical benefit. Other tissue types that may be suitable for the delivery system include most allografts from viscous liquids to granular compressible solids. The bone graft may exclude DBM.

The tissue graft may comprise a bone graft comprising nondemineralized corticocancellous bone and demineralized ground cortical bone. The corticocancellous bone and the demineralized ground cortical bone may have a volume ratio from 10:1 to 1:10, from 5:1 to 1:5, from 5:1 to 1:4, from 5:1 to 1:3, from 5:1 to 1:2, from 5:1 to 1:1, from 5:1 to 2:1, from 5:1 to 3:1, from 5:1 to 4:1, from 4:1 to 1:5, from 4:1 to 1:4, from 4:1 to 1:3, from 4:1 to 1:2, from 4:1 to 1:1, from 4:1 to 2:1, from 4:1 to 3:1, from 3:1 to 1:5; from 3:1 to 1:4, from 3:1 to 1:3, from 3:1 to 1:2, from 3:1 to 1:1, from 3:1 to 2:1, from 2:1 to 1:5, from 2:1 to 1:4, from 2:1 to 1:3, from 2:1 to 1:2, from 2:1 to 1:1, from 1:1 to 1:5, from 1:1 to 1:4, from 1:1 to 1:3 or from 1:1 to 1:2. In some embodiments the nondemineralized corticocancellous bone includes corticocancellous bone, cortical bone, cancellous bone, or mixtures thereof.

The corticocancellous bone, cortical bone, cancellous bone, or mixtures thereof may comprise viable bone cells or bone forming cells. The corticocancellous bone may have a particle size of 0.1-40, 0.1-30, 0.1-20, 0.1-10, 0.1-5, 0.1-4, 0.1-3, 0.1-2, 0.1-1, 0.5-40, 0.5-30, 0.5-20, 0.5-10, 0.5-5, 0.5-4, 0.5-3, 0.5-2, 0.5-1, 1-40, 1-30, 1-20, 1-10, 1-5, 1-4, 1-3, 1-2, 2-40, 2-30, 2-20, 2-10, 2-5, 2-4, 2-3, 3-40, 3-30, 3-20, 3-10, 3-5, 3-4, 4-40, 4-30, 4-20, 4-10, 4-5, 5-40, 5-30, 5-20, 5-10, 10-40, 10-30, 10-20 or 20-30 mm, at least 0.1, 0.5, 1, 2, 3, 4, 5, 10, 20 or 30 mm, or no more than 0.5, 1, 2, 3, 4, 5, 10, 20, 30 or 40 mm.

The corticocancellous bone, cortical bone, cancellous bone, or mixtures thereof may be demineralized or sintered.

The demineralized ground cortical bone may have residual calcium at 0.1-8, 0.1-5, 0.1-4, 0.1-3, 0.1-2, 0.1-1, 0.5-8, 0.5-5, 0.5-4, 0.5-3, 0.5-2, 0.5-1, 1-8, 1-5, 1-4, 1-3, 1-2, 2-8, 2-5, 2-4, 2-3, 3-8, 3-5, 3-4, 4-8, 4-5, or 5-8%, more than 0.1, 0.5, 1, 2, 3, 4, 5, or 8%, or less than 0.5, 1, 2, 3, 4, 4.1, 4.2, 4.3, 4.4, 4.5, 4.6, 4.7, 4.8, 4.9, 5, or 8%. The demineralized cortical bone may have a particulate size of 1-10,000, 1-5,000, 1-1,000, 1-500, 1-100, 10-10,000, 10-5,000, 10-1,000, 10-500, 10-100, 100-10,000, 100-5,000, 100-1,000, 100-500, 200-10,000, 200-5,000, 200-1,000, 200-500, 250-10,000, 250-5,000, 250-1,000, 250-500, 500-10,000, 500-5,000 or 500-1,000 μm.

The demineralized ground cortical bone may be free of, for example, or may comprise no more than 1, 2, 3, 4, 5, 6, 7, 8, 9 or 10% by weight, based on the total weight of the demineralized ground cortical bone, a soft tissue, or foreign particles. Examples of the soft tissues include tendon, ligament, vascular tissues, fascia, skin, dermis, adipose, placenta and nerve tissue. Examples of the foreign particles include synthetic materials, metal, tricalcium phosphate, calcium phosphate, hydroxyapatite, calcium sulfate and synthetic polymers. The cannula may further comprise a cryoprotectant. Examples of the cryoprotectants include dimethyl sulfoxide (DMSO), ethylene glycol, glycerol, 2-methyl-2,4-pentanediol (mpd), propylene glycol, sucrose, and trehalose. For example, the demineralized ground cortical bone may be in an aqueous culture media containing DMSO at, for example, 2%, 5%, 10%, 15%, 20% or 30%, and serum albumin at, for example, 5%, 10%, 15%, 20%, 25%, 30%, based on total volume of the culture media. The tissue graft in the cannula may be cryopreserved. The bone graft may comprise demineralized bone matrix (DBM) no more than 5, 4, 3, 2, 1, 0.5 or 0.1% residual calcium by weight based on the total weight of the bone graft. The bone graft may comprise nondemineralized corticocancellous bone and demineralized ground cortical bone at a volume ratio from 2:1 to 3:1.

In one embodiment, the bone graft may comprise demineralized ground cortical bone and nondemineralized bone chips, wherein the bone chips comprise cortical, corticocancellous, cancellous, or combinations thereof, and the bone chips include viable bone-forming cells.

The cannula may be a syringe cannula. The cannula may be an IV cannula or nasal cannula but without trocar or needle. The cannula may be straight or curved.

The treatment site may be at any location in the body of the subject. For example, the treatment site may be in a spine, dental, foot, jaw, ankle, limb bone or joint. The treatment site may also be a defect site in a soft tissue, cartilage defect, synovial membrane, or spine disc. Where the cannula is used for intervertebral fusion, the treatment site may be around a cage or into a cage, which may be expandable. The treatment site may be in the disc space around or within an interbody cage.

In some embodiments, the cannula of the present invention may be pre-filled or loaded with a tissue graft. The cannula may be provided with a delivery device. For convenience, a package of two, three or more cannulas and one delivery device is provided in one exemplary embodiment. The product components may be individually packaged and stored, and each cannula and delivery device is intended for a single patient use in accordance with certain aspects of the invention.

The cannula may be useful for spine or general orthopedic applications. The cannula may have printed volume graduations or indicators on the cannula. One or more radiopaque markers may be used for detection of the cannula tip in the disc space using radioscopy. Other functional cannula design modifications may be introduced. For example, tip adapters or threads may be added to facilitate interbody cage filling with allograft.

For each cannula of the present invention, systems for delivering a tissue graft to a treatment site are provided. According to certain aspects of the invention, a system may comprise a cannula and a delivery device. In one embodiment, the delivery device includes a push rod and a push handler. The push rod approaches and contacts the tissue graft in the cannula from the proximal end to extrude tissue at the distal end. The push handler forces the push rod to push the tissue graft out of the cannula at the distal end to the treatment site. The push rod may also be called plunger or racheting plunger.

The delivery device provides a mechanical advantage. The mechanical advantage may be the force amplification generated by the push handler and the push rod. The mechanical advantage may be in the range of 1-10, 1-9.5, 1-9, 1-8.5, 1-8, 1-7.5, 1-7, 1-6.5, 1-6, 1-5.5, 1-5, 1-4.5, 1-4, 1-3.5, 1-3, 1-2.5, 1-2, 2-10, 2-9, 2-8, 2-7, 2-6, 2-5, 2-4, 2-3, 2.5-10, 2.5-9.5, 2.5-9, 2.5-8.5, 2.5-8, 2.5-7.5, 2.5-7, 2.5-6.5, 2.5-6, 2.5-5.5, 2.5-5, 2.5-4.5, 2.5-4, 2.5-3.5, 2.5-3, 3-10, 3-9, 3-8, 3-7, 3-6, 3-5, 3-4, 4-10, 4-9, 4-8, 4-7, 4-6, 4-5, 5-10, 5-9, 5-8, 5-7, 5-6, 6-10, 6-9, 6-8, 6-7, 7-10, 7-9, 7-8, 8-10, 8-9 or 9-10. The mechanical advantage may be greater than 1, 1.5, 2, 2.5, 3, 3.5, 4, 4.5, 5, 5.5, 6, 6.5, 7, 7.5, 8, 8.5, 9, 9.5 or 10.

Figure 9:
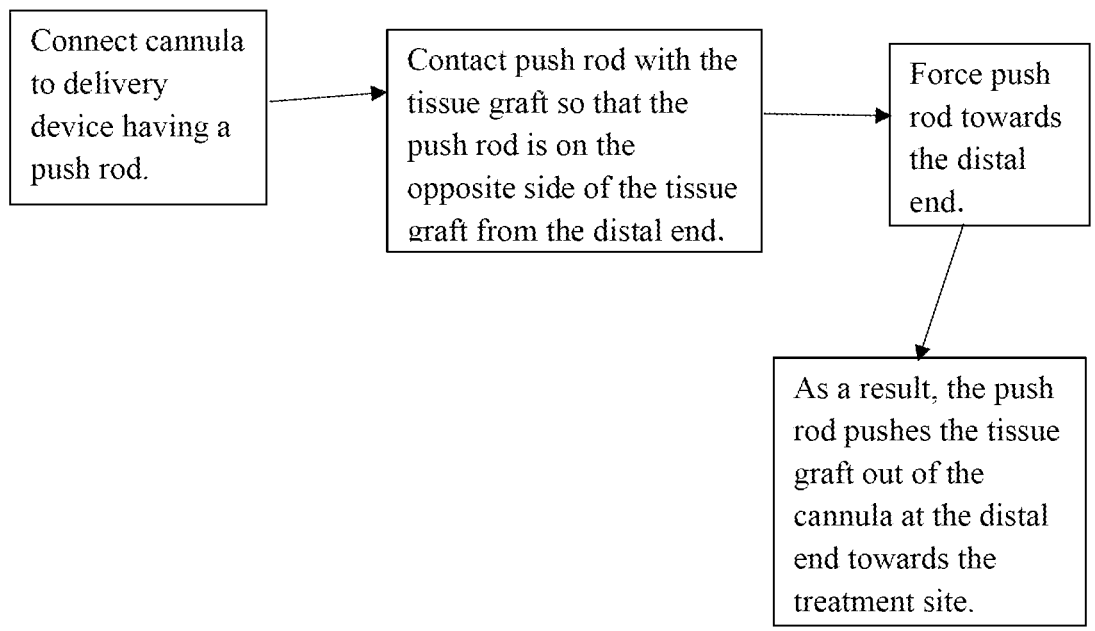
FIG. 9 is a flow diagram showing a method for delivering a tissue graft to a treatment site, according to an embodiment of the invention.

As shown in FIG. 9, a method for delivering a tissue graft to a treatment site is provided. In one aspect, a method comprises connecting the cannula of the present invention with a delivery device having a push rod. The method may further comprise contacting the push rod with the tissue graft so that the push rod is on the opposite side of the tissue graft from the distal end; and forcing the push rod towards the distal end. As a result, the push rod pushes the tissue graft out of the cannula at the distal end to the treatment site according to this example.

According to the method of the present invention, the push rod may push the tissue graft at a pressure of 100-5,000, 100-4,500, 100-4,000, 100-3,500, 100-3,000, 100-2,500, 100-2,000, 100-1,500, 100-1,000, 100-500, 500-5,000, 500-4,500, 500-4,000, 500-3,500, 500-3,000, 500-2,500, 500-2,000, 500-1,500, 500-1,000, 1,000-5,000, 1,000-4,500, 1,000-4,000, 1,000-3,500, 1,000-3,000, 1,000-2,500, 1,000-2,000, 1,000-1,500, 1,500-5,000, 1,500-4,500, 1,500-4,000, 1,500-3,500, 1,500-3,000, 1,500-2,500, 1,500-2,000, 2,000-5,000, 2,000-4,500, 2,000-4,000, 2,000-3,500, 2,000-3,000, 2,000-2,500, 2,500-5,000, 2,500-4,500, 2,500-4,000, 2,500-3,500, 2,500-3,000, 3,000-5,000, 3,000-4,500, 3,000-4,000, 3,000-3,500, 4,000-5,000, 4,000-4,500 or 4,500-5,000 psi, no more than 5,000, 4,500, 4,000, 3,500, 3,000, 2,5000, 2,000, 1,500, 1,000 or 500 psi, or at least 4,500, 4,000, 3,500, 3,000, 2,5000, 2,000, 1,500, 1,000 or 500 psi.

According to the method of the present invention, the maximum extrusion force for pushing the tissue graft from the cannula to the treatment site may be 100-300, 100-250, 100-200, 100-190, 100-180, 110-170, 110-160, 100-150, 100-140, 100-130, 100-120, 100-110, 110-300, 110-250, 110-200, 110-190, 110-180, 110-170, 110-160, 110-150, 110-140, 110-130, 110-120, 120-300, 120-250, 120-200, 120-190, 120-180, 120-170, 120-160, 120-150, 120-140, 120-130, 130-300, 130-250, 130-200, 130-190, 130-180, 130-170, 130-160, 130-150, 130-140, 140-300, 140-250, 140-200, 140-190, 140-180, 140-170, 140-160, 140-150, 150-300, 150-250, 150-200, 150-190, 150-180, 150-170, 150-160, 160-300, 160-250, 160-200, 160-190, 160-180, 160-170, 170-300, 170-250, 170-200, 170-190, 170-180, 180-300, 180-250, 180-200, 180-190, 190-300, 190-250, 190-200, 200-300, 200-250 or 250-300 N, no more than 110, 120, 130, 140, 150, 160, 170, 180, 190, 200, 250 or 300 N, or no less than 100, 110, 120, 130, 140, 150, 160, 170, 180, 190, 200, 250 or 300 N. In one embodiment, the maximum extrusion force may be 180-190 N (e.g., 187 N) or 150-160 N (e.g., 152 N).

Figure 10:
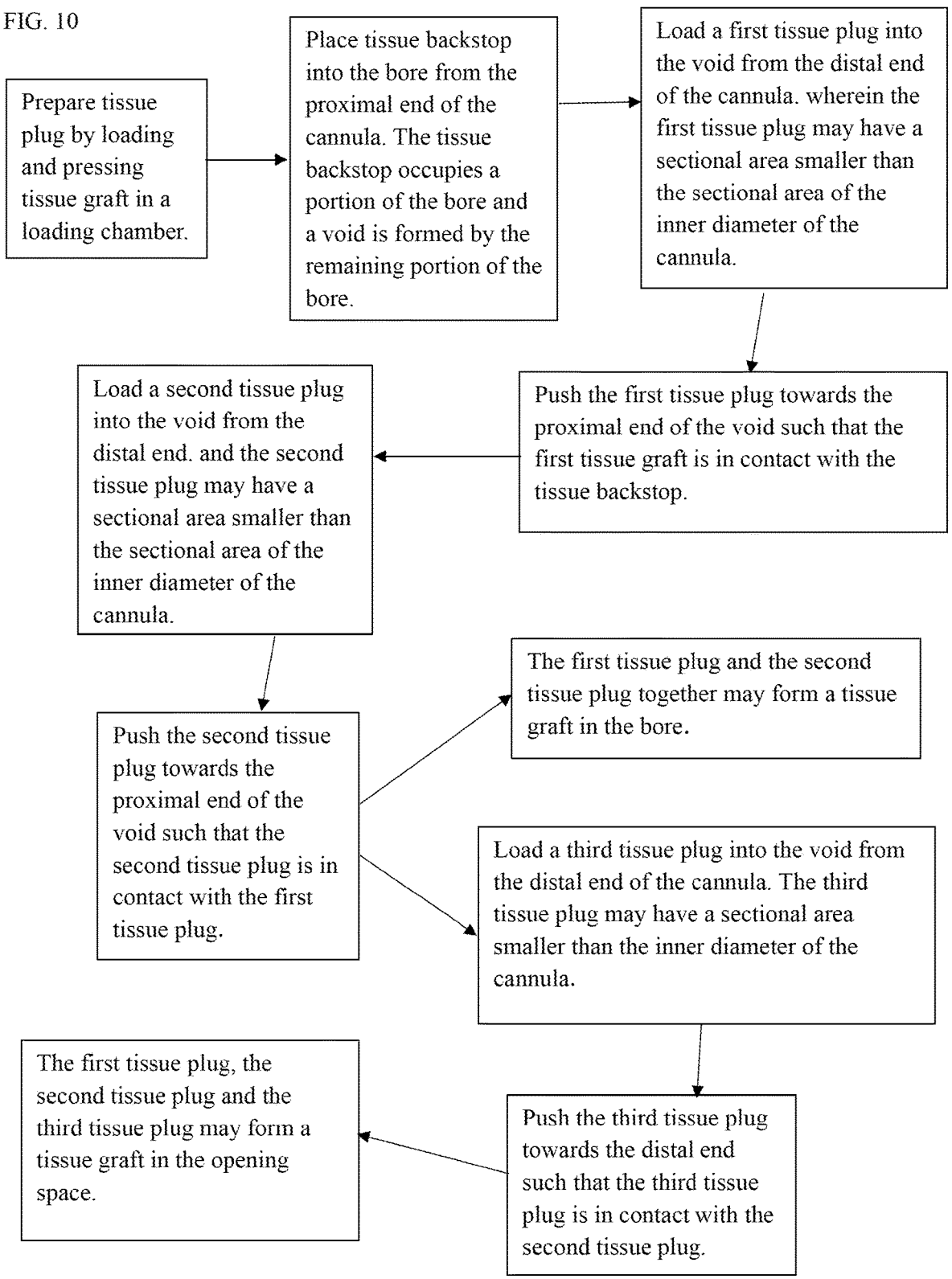
FIG. 10 is a flow diagram showing a method for preparing a cannula according an embodiment of the invention.

For each cannula of the present invention, methods for preparing the cannulas are provided as shown in FIG. 10. In certain aspects, preparation methods comprise preparing a tissue plug by loading and pressing tissue graft in a loading chamber. In one aspect, the method further comprises placing a tissue backstop into the bore from the proximal end of the cannula. The tissue backstop occupies a portion of the bore and a void is formed by the remaining portion of the bore. The preparation method further comprises loading a first tissue plug into the void from the distal end of the cannula, wherein the first tissue plug may have a sectional area smaller than the sectional area of the inner diameter of the cannula; pushing the first tissue plug towards the proximal end of the void such that the first tissue graft is in contact with the tissue backstop. In another aspect, a second tissue plug is loaded into the void from the distal end, and the second tissue plug may have a sectional area smaller than the sectional area of the inner diameter of the cannula; pushing the second tissue plug towards the proximal end of the void such that the second tissue plug is in contact with the first tissue plug. The first tissue plug and the second tissue plug together may form a tissue graft in the bore.

Another method for preparing the cannula of the present invention is further provided. As shown in FIG. 11, the preparation method comprises placing a tissue backstop into the bore from the proximal end of the cannula such that the tissue backstop occupies a portion of the bore and a void is formed by the remaining portion of the bore. The preparation method also comprises loading a first tissue plug into the void from the distal end of the cannula, and the first tissue plug has a cross-sectional diameter smaller than the inner diameter of the cannula. The preparation method further comprises pushing the first tissue plug towards the proximal end of the void such that the first tissue graft is in contact with the tissue backstop. The preparation method further comprises loading a second tissue plug into the void from the distal end, and the second tissue plug has a cross-sectional diameter smaller than the inner diameter of the cannula. The preparation method further comprises pushing the second tissue plug towards the proximal end of the void such that the second tissue graft is in contact with the first tissue plug. The first tissue plug and the second tissue plug form the tissue graft in the cannula.

The predetermined final loading pressure according to the invention may be about 1-1,000, 10-1,000, 20-1,000, 50-1,000, 100-1,000, 1-500, 10-500, 20-500, 50-500, 100-500, 1-400, 10-400, 20-400, 50-400, 100-400, 1-300, 10-300, 20-300, 50-300, 100-300, 1-200, 10-200, 20-200, 30-200, 40-200, 50-200, 60-200, 70-200, 80-200, 90-200, 100-200, 110-200, 120-200, 130-200, 140-200, 150-200, 20-150, 30-150, 40-150, 50-150, 60-150, 70-150, 80-150, 90-150, 100-150, 110-150, 120-150, 130-150, 140-150, 20-140, 30-140, 40-140, 50-140, 60-140, 70-140, 80-140, 90-140, 100-140, 110-140, 120-140, 130-140, 20-130, 30-130, 40-130, 50-130, 60-130, 70-130, 80-130, 90-130, 100-130, 110-130, 120-130, 20-120, 30-120, 40-120, 50-120, 60-120, 70-120, 80-120, 90-120, 100-120, 110-120, 20-110, 30-110, 40-110, 50-110, 60-110, 70-110, 80-110, 90-110, 100-110, 20-100, 30-100, 40-100, 50-100, 60-100, 70-100, 80-100, 90-100, 20-90, 30-90, 40-90, 50-90, 60-90, 70-90, 80-90, 20-80, 30-80, 40-80, 50-80, 60-80, 70-80, 20-70, 30-70, 40-70, 50-70, 60-70, 20-60, 30-60, 40-60, 50-60, 20-50, 30-50, 40-50, 20-40 or 30-40 psi. For example, the predetermined final loading pressure may be 63-111 psi.

The preparation method as shown in either FIG. 10 or FIG. 11 may further comprise, for example, loading a third tissue plug into the void from the distal end of the cannula, wherein the third tissue plug may have a sectional area smaller than the inner diameter of the cannula; and pushing the third tissue plug towards the distal end such that the third tissue plug is in contact with the second tissue plug. The first tissue plug, the second tissue plug and the third tissue plug may form a tissue graft in the opening space. The predetermined final loading pressure may be about 1-1,000, 10-1,000, 20-1,000, 50-1,000, 100-1,000, 1-500, 10-500, 20-500, 50-500, 100-500, 1-400, 10-400, 20-400, 50-400, 100-400, 1-300, 10-300, 20-300, 50-300, 100-300, 1-200, 10-200, 20-200, 30-200, 40-200, 50-200, 60-200, 70-200, 80-200, 90-200, 100-200, 110-200, 120-200, 130-200, 140-200, 150-200, 20-150, 30-150, 40-150, 50-150, 60-150, 70-150, 80-150, 90-150, 100-150, 110-150, 120-150, 130-150, 140-150, 20-140, 30-140, 40-140, 50-140, 60-140, 70-140, 80-140, 90-140, 100-140, 110-140, 120-140, 130-140, 20-130, 30-130, 40-130, 50-130, 60-130, 70-130, 80-130, 90-130, 100-130, 110-130, 120-130, 20-120, 30-120, 40-120, 50-120, 60-120, 70-120, 80-120, 90-120, 100-120, 110-120, 20-110, 30-110, 40-110, 50-110, 60-110, 70-110, 80-110, 90-110, 100-110, 20-100, 30-100, 40-100, 50-100, 60-100, 70-100, 80-100, 90-100, 20-90, 30-90, 40-90, 50-90, 60-90, 70-90, 80-90, 20-80, 30-80, 40-80, 50-80, 60-80, 70-80, 20-70, 30-70, 40-70, 50-70, 60-70, 20-60, 30-60, 40-60, 50-60, 20-50, 30-50, 40-50, 20-40 or 30-40 psi. For example, the predetermined final loading pressure may be 63-111 psi.

It is understood that any number of tissue plugs may be employed to load a cannula, for example, one, two, three, four or more tissue plugs, according to the principles of the invention.

The preparation method may further comprise preparing the first tissue plug, and/or the second tissue plug and/or the third tissue plug, for example, in a predetermined shape. The predetermined shape may be a cylinder suitable for loading into a cannula. In one embodiment, the predetermined shape may have a diameter smaller than the inner diameter of the cannula for ease of loading and to avoid potential jamming caused by cannula surface roughness, misalignment, tissue plug expansion, and the like.

The tissue plug may be prepared in a loading device according to the principles of the invention. The loading device may have a chamber and the chamber may be cylindrical. The cylindrical chamber may have a cross-sectional diameter smaller than the inner diameter of the cannula by, for example, 0.1-1, 0.1-0.5, 0.2-1, 0.2-0.5, 0.3-1, 0.3-0.5, 0.4-1, 0.4-0.5 or 0.5-1 mm. The preparation method may further comprise pressing the first tissue into a first tissue plug in the cylindrical chamber. The preparation method may further comprise pressing the second tissue into a second tissue plug in the cylindrical chamber. The preparation method may further comprise pressing additional tissue into subsequent tissue plugs in the cylindrical chamber.

The loading device may comprise a first component and a second component. The first component has a first opening. The second component has a second opening. The chamber in the loading device may formed by mating the first opening and the second opening to form a chamber. The chamber may have a cross-section, optionally a circular cross-section. In certain two component embodiments, each component contributes substantially equally to the overall cross-section of the tissue plug and, in other designs, one component forms a greater portion of the cross-section such that the first opening constitutes 50-80%, 50-70% or 50-60%, at least 50%, 60%, 70% or 80%, or less than 50%, 60%, 70% or 80% of the circular cross-section of the chamber. It is understood that multiple components, such as three or more, may be constructed to create a chamber in the loading device that may be used to form a tissue plug suitable for loading into a cannula according to the invention.

The inner surface of the chamber may have surface roughness of 20-50, 20-40, 20-30, 30-50, 30-40, 40-50, no more than 20, 30, 35, 40 or 50, or no less than 20, 30, 40 of 50 microinches Root Mean Square (RMS). In one embodiment, the inner surface of the chamber may have surface roughness of no more than 32 microinches RMS.

The interior surface of the cannula may have surface roughness of 20-50, 20-40, 20-30, 30-50, 30-40, 40-50, no more than 20, 30, 35, 40 or 50, or no less than 20, 30, 40 of 50 microinches RMS. In one embodiment, the interior surface of the cannula has surface roughness of no more than 32 microinches RMS.

The term "about" as used herein when referring to a measurable value such as an amount, a percentage, and the like, is meant to encompass variations of ±20% or ±10%, ±5%, ±1%, or ±0.1% from the specified value, as such variations are appropriate.

Example 1. Loading

Figure 8:
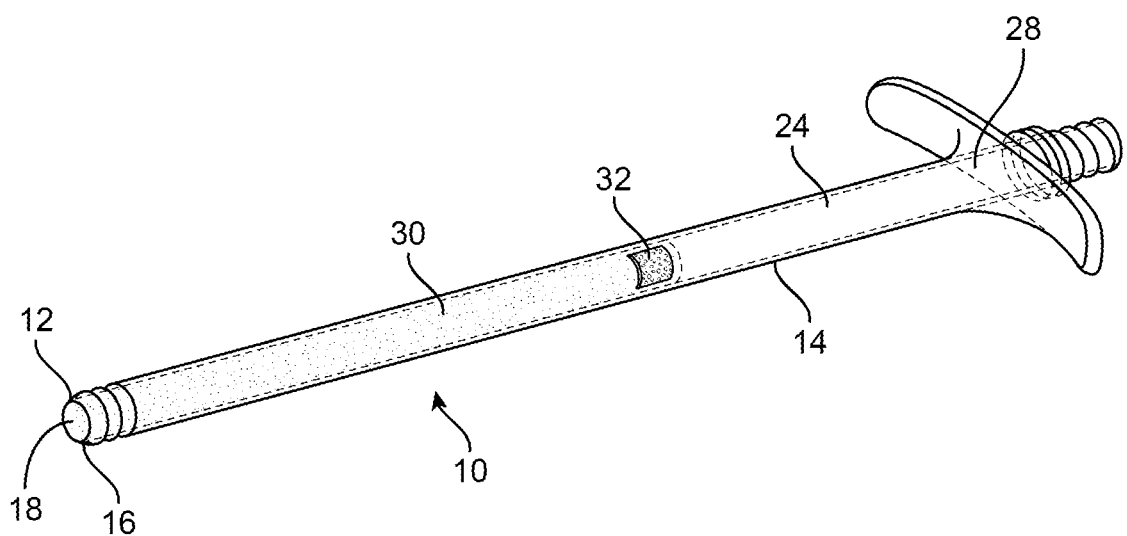
FIG. 8 shows a rendered depiction of a cannula, which has been pre-filled with a tissue graft, according to one embodiment of the present invention.

Testing was performed on a loading device as depicted in FIG. 1 using spring resistance (k) and a visual indicator of spring compression distance (x) to provide visual feedback on final compression force (F=k*x) and hence final loading pressure (P=F/A). The figure shows a moving cannula support plate with a dowel pressed into it which slides into the cannula bore from the proximal end, until the proximal end of the cannula comes in contact with the moving cannula support plate. The dowel was employed, through a portion of the cannula, to provide support for the cannula and to define the void to be filled by tissue graft. The backing plate and cannula were pressed forward by springs that were compressed between the moving cannula support plate and a stationary backing plate. The distal end of the cannula was fixed into a 0.25 in deep counterbore leading to the loading chamber of the loading device. The loading device was designed with two springs in parallel, so the effective spring coefficient is the sum of the two individual spring coefficients. The effective spring coefficient is 6.66 lb/in. The uncompressed spring length was 1 in. When the cannula was loaded into the loading device, the springs were compressed by 0.44 in, creating a compression force on the cannula at $(k_1+k_2)*x_1$, that is (3.33+3.33) (0.44), i.e., 6.66 lb/in*0.44 in=2.93 lb. This compression force prevented the cannula from moving toward the springs and away from the tissue graft being loaded at the distal end of the cannula. Once a tissue plug entered the cannula and was pushed to the back of the void, the slowly increasing loading force was transmitted through the tissue plug into the dowel until the calculated 2.93 lb of spring compression force was overcome, causing the cannula to start to move out of the counterbore towards the proximal end of the cannula. If the cannula moves completely out of the counterbore, the springs will be compressed at least another 0.25 in, meaning the cannula removal force on the tissue has risen to at least $(k_1+k_2)*(x_1+X2)$, that is (3.33+3.33)*(0.44+0.25), i.e., 6.66 lb/in*(0.44 in +0.25 in)=4.60 lb. If the cannula moves, but does not leave the counterbore, the compression force on the tissue will remain between these two limits. Since the cannula ID is 6 mm (0.23622 in), its cross-sectional area is 0.043825 $in^2$. The final loading pressure limits are then 2.93 lb/0.043825 $in^2$=66.9 psi and 4.60 lb/0.043825 $in^2$=104.9 psi, respectively. The resulting tissue graft loaded into the cannula is depicted in FIG. 8.

Example 2. Tissue Graft Extrusion Testing

A study was performed to provide evidence that the loading tool is capable of consistent and reliable filling of the cannula with a tissue graft to demonstrate the ability of the loading tool to overcome donor and operator variation in controlling the force to extrude cannula from the delivery device. The resulting tissue graft loaded in the cannula were extruded from the cannula using a delivery device. The extrusion of the tissue graft from the cannula using a delivery device was experimentally tested in a laboratory and the force was measured using mechanical testing techniques. The results of the study confirmed that the force to extrude the tissue graft from the cannula using a delivery device was suitable because it was less than the acceptance criteria determined through ergonomics and human factors research for the intended use by the intended user (e.g., surgeon) in a clinical setting.

Figure 2:
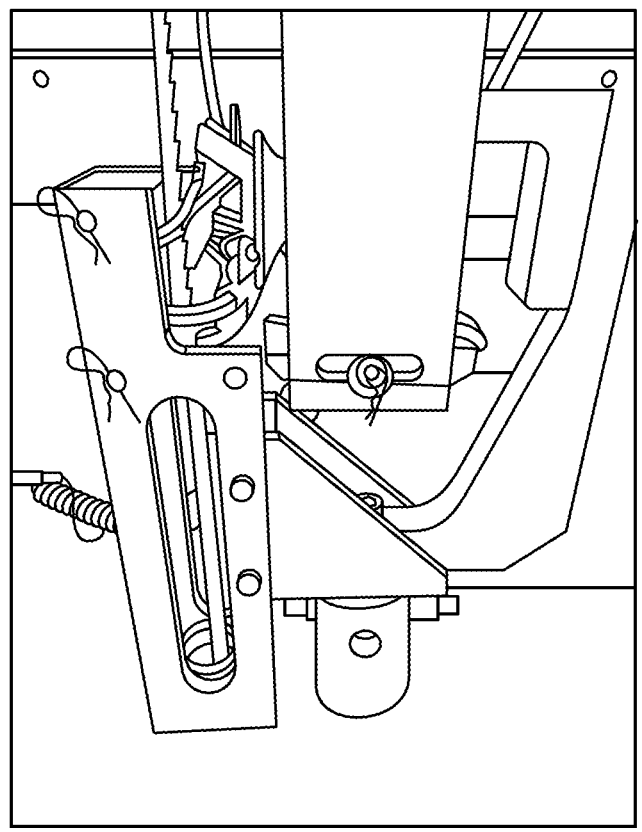
FIG. 2 shows a test fixture to restrain and actuate a delivery device while measuring extrusion force with a load cell.
Figure 3:
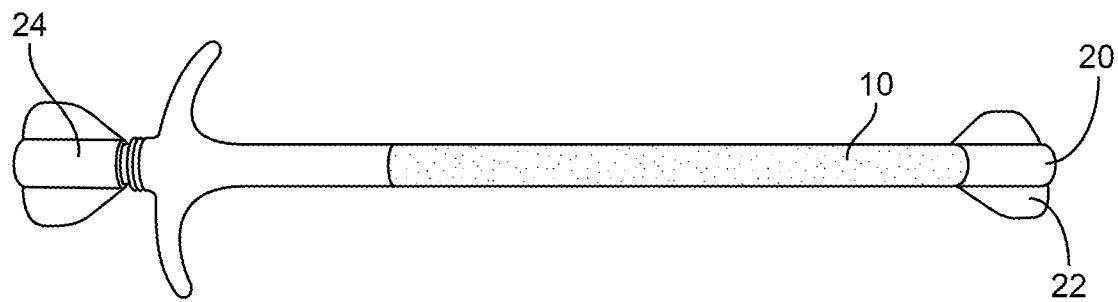
FIG. 3 shows a cannula with a tissue graft according to one embodiment of the present invention.
Figure 4:
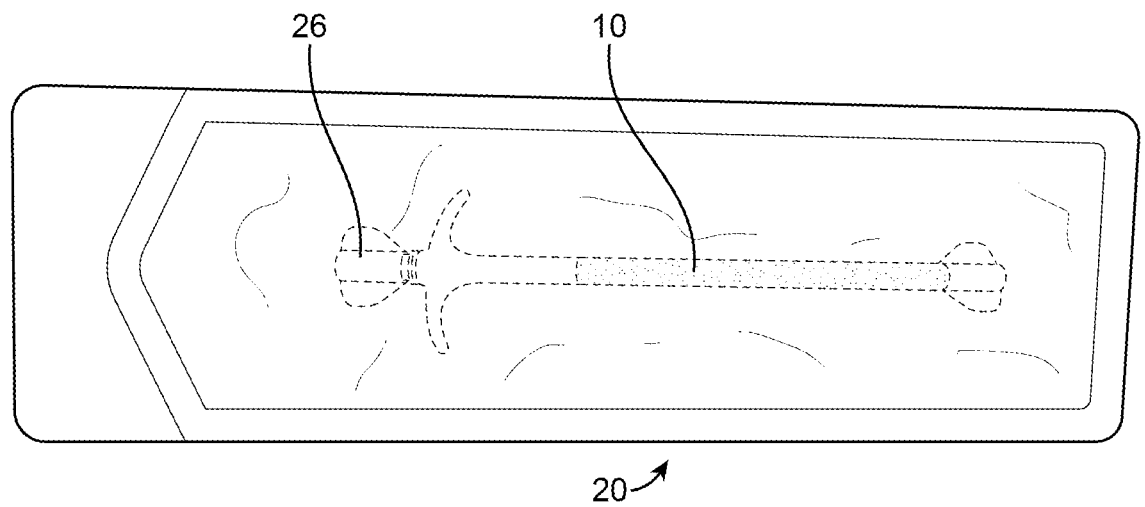
FIG. 4 shows a cannula with a tissue graft in representative commercial packaging according to another embodiment of the present invention.

Cannulas loaded with the aliquot tool were extruded using a delivery device placed in a test fixture, where motion and forces were controlled by an Instron testing machine. The delivery device was held with the distal end with the plunger facing down, while the Instron pulled up on the handle of the delivery device, as seen in FIG. 2, and measured the resistance force from this handle during extrusion using a load cell connected to a computer.

The study design included tissue graft filled cannulas prepared from four different tissue donors, mixed with cryoprotectant and filled using the loading tool to a final volume of 3 cm$^3$ (cc). Multiple replicates were made of each tissue graft filled cannula sample for testing by four different operators. Tissue graft filled cannula were packaged, cryopreserved and transferred to frozen storage for 48 hrs prior to testing. Tissue graft filled cannula were thawed using a water bath and coupled with the delivery system to prepare for extrusion.

Figure 5:
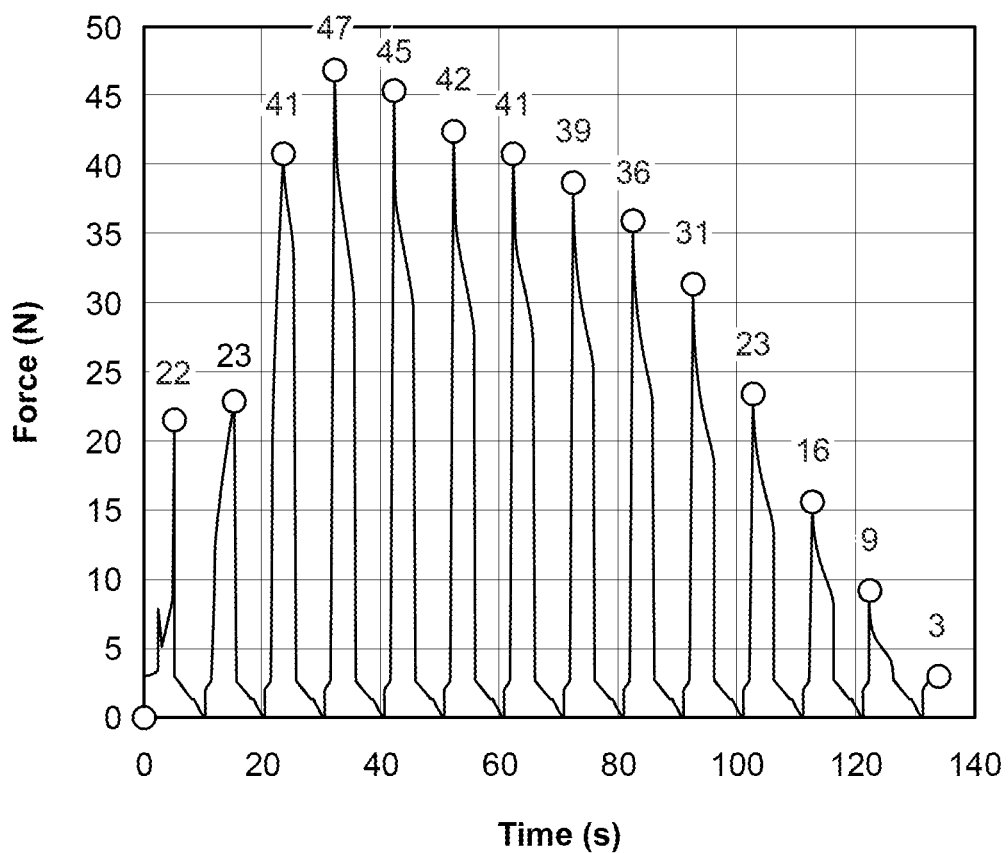
FIG. 5 shows high frequency Instron load cell measurements of handle resistance during cannula extrusion of a sample tissue graft using a delivery device and Instron test fixture. Each peak in the force measurement corresponds to a pull of the device handle, advancing the push rod down the cannula.

An example of typical force versus time data obtained in this study is shown in FIG. 5. When the test starts, the computer starts collecting, at a high sampling rate, the values from the load cell reading the resistance of the delivery device handle actuation. The push rod has already been advanced though the empty part of the cannula so that it is adjacent to the tissue graft. Each time the handle is actuated, a stroke cycle occurs where the push rod advances about 9 mm or a volume of about 0.25 cm$^3$. At the beginning of the test, the push rod is just coming into contact with the tissue. Since the tissue graft has more surface area in contact with the cannula walls than the individual tissue plugs that were loaded, and hence more friction, it is believed that the tissue compresses a small amount before the tissue at the distal end begins to extrude out of the cannula. The force required to extrude increases as the tissue compresses or becomes more tightly packed with further strokes. Then at some point it is theorized that the decreasing surface area due to push rod advancement and tissue extrusion leads to a decrease in the extrusion force measured until the cannula is empty. Once the cannula is empty, the force reading will only be a function of friction and mass of the delivery device and fixture.

Figure 6:
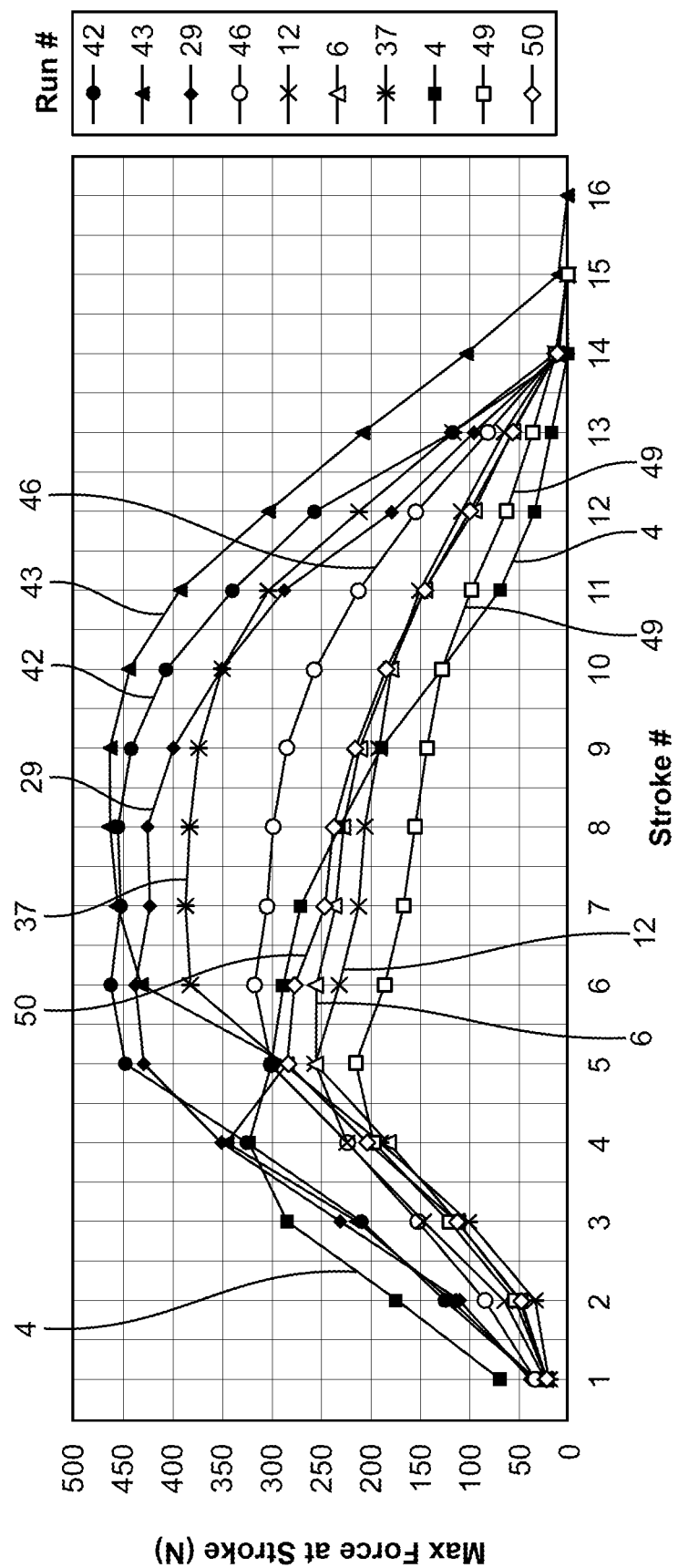
FIG. 6 shows estimated maximum force of the push rod on the tissue at stroke (N) over stroke number 1 through 16 during extrusion from a delivery device for several test articles. The mechanical advantage for this example was estimated as 3.8 times the measured extrusion force applied to the device handle and used to scale the data recorded by the Instron test fixture in FIG. 2. The plot shows variations from cannula to cannula, which includes variations from donor to donor and loading technician to loading technician.
Figure 7:
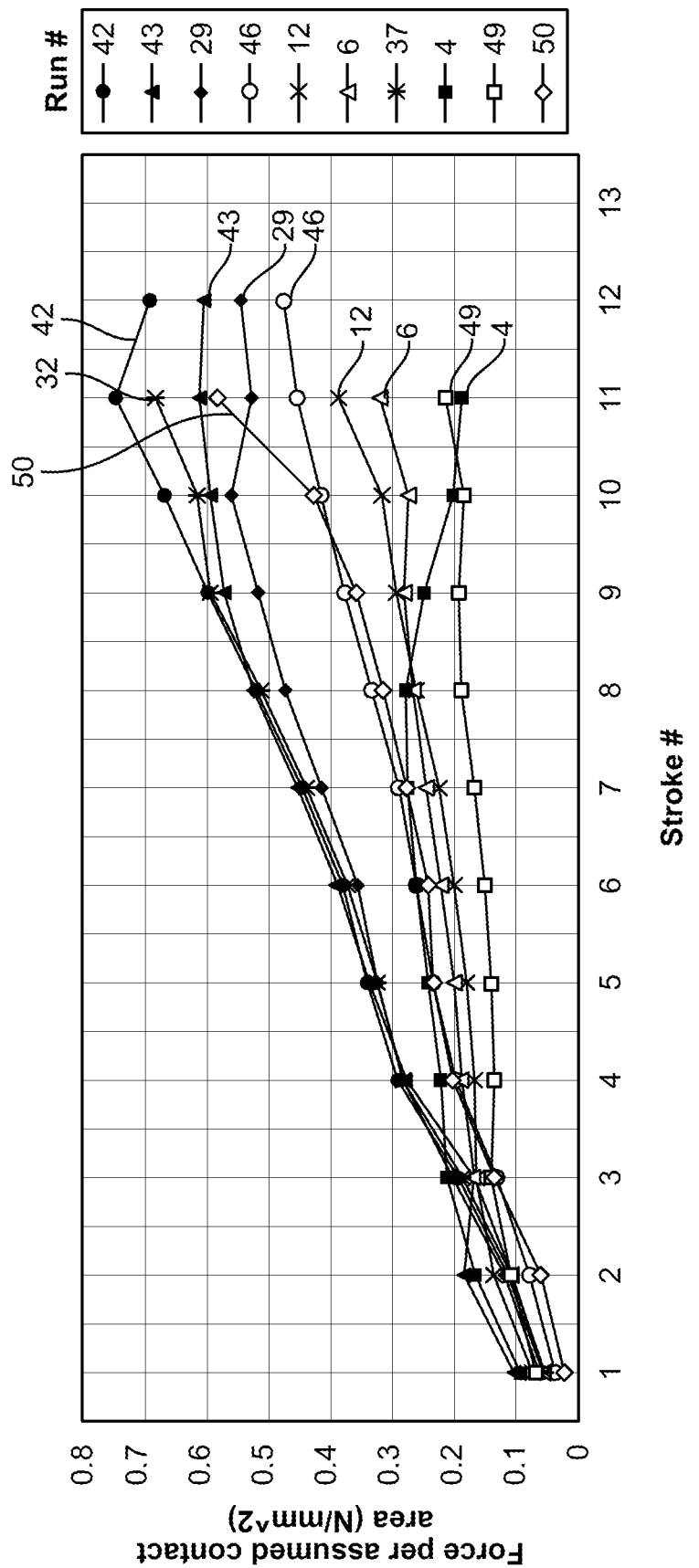
FIG. 7 shows force per assumed contact area (N/mm$^2$) over stroke number 1 through 13. This data takes the data points in FIG. 6 and makes assumptions about the amount of the tissue graft remaining in the cannula during that stroke (i.e., the last stroke recorded, which has very little resistance force, is assumed to be empty and so the stroke prior to that has approximately 0.25 cc (i.e., cm$^3$) tissue based on the spacing of teeth on the push rod in the delivery device. Working backwards from the last stroke, the length of the graft in the cannula may be determined and therefore the surface area in contact with the cannula at each stroke). The peak force from FIG. 6 divided by the assumed surface area of contact between the graft and cannula may be calculated to show that the friction force is likely increasing, possibly due to tissue graft compression and increased force on the cannula walls, even as the tissue graft is being extruded from the cannula.

To analyze the maximum extrusion forces, only the peak force from each stroke is needed. This experimental setup measures the force on the delivery device handle, of which the maximum values from each cannula are shown in Table 1. It is also of interest to estimate the force being directly applied to the tissue from the push rod. An estimate of the mechanical advantage of the delivery device in the test fixture was made using measurements of the geometry and found to be approximately 3.8. This mechanical advantage was multiplied by the peak force data from each stroke and plotted for several cannula in FIG. 6. To analyze the effect of the translation distance and compression of the tissue graft on extrusion force, some estimates of tissue surface contact with the cannula were calculated. The last stroke recorded, which has very little resistance force, is assumed to be empty and so the stroke prior to that has approximately 0.25 cm$^3$ tissue based on the spacing of teeth on the push rod in the delivery device. Working backwards from the last stroke, the length of the graft in the cannula was determined and therefore the surface area in contact with the cannula at each stroke was estimated. The peak force from FIG. 6 was then divided by the assumed surface area of contact between the graft and cannula, plotted in FIG. 7, to show that the friction force is likely increasing, possibly due to graft compression and increased force on the cannula walls, even as tissue is being extruded from the cannula.

The results indicated that all samples had a peak extrusion force less than 187N (42 lbf). The average extrusion force was 74N (16.6 lbf) with a standard deviation of 23N (5.17 lbf). The actuation method used in the engineering study in combination with the geometry of the delivery device had a conservatively approximated mechanical advantage of 3.8, which would lead to an average of force applied directly to the tissue of 281.2N with a standard deviation of 87.4N. The study concluded that there is 95% confidence that 95% of the observed population of extrusion forces with the tissue filled cannula delivery system will be 154N or less, below the acceptance criteria of 187N. As shown in Table 1, the results of this study demonstrate that aliquot tool has been validated for its intended use to control loading forces when aliquoting tissue graft in the cannula.

The tissue weight in each ranged from 3.5 g to 3.8 g, and the tissue density was from 1.1 g/cm$^3$ (3.5 g/3 cm$^3$) to 1.3 g/cm$^3$ (3.8 g/3 cm$^3$).

Results of this study demonstrate that the aliquot tool has been validated for its intended use to control loading forces when loading graft tissue into the cannula.

All documents, books, manuals, papers, patents, published patent applications, guides, abstracts, and/or other references cited herein are incorporated by reference in their entirety. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

TABLE 1

Mechanical Extrusion Results

| Donor | Sample Number | Operator & Maximum Extrusion Force (N) | | | |
|---|---|---|---|---|---|
| | | 1 | 2 | 3 | 4 |
| 1914254 | 2 | 61 | 50 | 73 | 64 |
| | 3 | 83 | 69 | 96 | 68 |
| | 4 | 89 | 22 | 44 | 73 |
| | 5 | 85 | 76 | 70 | 56 |
| 2010300 | 2 | 101 | 108 | 63 | 81 |
| | 3 | 108 | 122 | 35 | 90 |
| | 4 | 84 | 122 | 37 | 57 |
| | 5 | 63 | 121 | 102 | 81 |
| 2011087 | 2 | 94 | 54 | 62 | 81 |
| | 3 | 58 | 51 | 73 | 77 |
| | 4 | 121 | 84 | 56 | 68 |
| | 5 | 115 | 54 | 59 | 82 |
| 2013206 | 2 | 87 | 67 | 49 | 84 |
| | 3 | 78 | 59 | 51 | 63 |
| | 4 | 60 | 32 | 67 | 106 |
| | 5 | 74 | 44 | 43 | 101 |
| 95% confidence | | 134 | 152 | 109 | 113 |

TABLE 1-continued

Mechanical Extrusion Results

| | | Operator & Maximum Extrusion Force (N) | | | |
|---|---|---|---|---|---|
| Donor | Sample Number | 1 | 2 | 3 | 4 |
| | that 95% of the population is below | | | | |
| | Average | | 74 | | |
| | StDev | | 23 | | |

What is claimed:

1. A cannula for delivering a tissue graft to a treatment site, comprising a distal end, a proximal end, a bore formed by an interior surface of the cannula, extending from the distal end to the proximal end and having an inner diameter, and a tissue graft inside the bore and in contact with the interior surface, wherein the tissue graft is released from the cannula at the distal end to the treatment site, wherein the tissue graft has a final loading pressure of 20-200 psi.

2. The cannula of claim 1, wherein the cannula has a particulate density of 1.1-1.3 g/cm$^3$.

3. The cannula of claim 1, wherein the tissue graft has a maximum extrusion force of less than 190 N.

4. The cannula of claim 1, further comprising more than 5,000 viable bone cells or bone forming cells per cm$^3$ wherein the tissue graft is a bone graft.

5. The cannula of claim 1, further comprising a cryopreservation solution in the bore, wherein the tissue graft is a bone graft comprising bone particulates having viable bone cells or bone forming cells, and the volume ratio of the cryopreservation solution to the bone graft is less than 2.

6. The cannula of claim 1, further comprising a cryopreservation solution in the bore, wherein the tissue graft is a bone graft, the bone graft comprises bone particulates having viable bone cells or bone forming cells, and the bone graft excludes demineralized bone matrix (DBM).

7. The cannula of claim 1, further comprising a cryoprotectant, wherein the tissue graft is a bone graft, the bone graft comprises demineralized ground cortical bone and nondemineralized bone chips, the bone chips comprise cortical, corticocancellous, cancellous, or combinations thereof, and the bone chips comprise viable bone-forming cells.

8. The cannula of claim 1, wherein the tissue graft is a cryopreserved bone graft, the bone graft comprises demineralized ground cortical bone and nondemineralized bone chips, the bone chips comprise cortical, corticocancellous, cancellous, or combinations thereof, and the bone chips comprise viable bone-forming cells.

9. A system for delivering a tissue graft to a treatment site, comprising:
(a) the cannula of claim 1; and
(b) a delivery device comprising a push rod and a push handler, wherein the push rod is in contact with the tissue graft and on the opposite side of the tissue graft from the distal end, and wherein the push handler forces the push rod to push the tissue graft out of the cannula at the distal end to the treatment site.

10. The system of claim 9, wherein the delivery device provides a mechanical advantage of 1 to 5.5.

11. A method for delivering a tissue graft to a treatment site, comprising (a) connecting the cannula of claim 1 with a delivery device, wherein the delivery device comprises a push rod;
(b) contacting the tissue graft with the push rod, wherein the push rod is on the opposite side of the tissue graft from the distal end; and
(c) forcing the push rod in step (b) towards the distal end, whereby the push rod pushes the tissue graft out of the cannula at the distal end to the treatment site.

12. The method of claim 11, wherein the push rod pushes the tissue graft at a pressure of no more than 4,000 psi in step (c).

13. A method for preparing the cannula of claim 1, comprising
(a) placing a tissue backstop into the bore from the proximal end of the cannula, whereby the tissue backstop occupies a portion of the bore and a void is formed by the remaining portion of the bore;
(b) loading a first tissue plug into the void from the distal end of the cannula, wherein the first tissue plug has a cross-sectional diameter smaller than the inner diameter of the cannula; and
(c) pushing the first tissue plug towards the proximal end of the void, whereby the first tissue plug is in contact with the tissue backstop and the tissue graft in the cannula comprises the first tissue plug.

14. The method of claim 13, further comprising
(d) loading a second tissue plug into the void from the distal end, wherein the second tissue plug has a cross-sectional diameter smaller than the inner diameter of the cannula; and
(e) pushing the second tissue plug towards the proximal end of the void, whereby the second tissue plug is in contact with the first tissue plug, whereby the tissue graft in the cannula comprises the first tissue plug and the second tissue plug.

15. The method of claim 14, further comprising:
(f) loading a third tissue plug into the void from the distal end, wherein the third tissue plug has a cross-sectional diameter smaller than the inner diameter of the cannula; and
(g) pushing the third tissue plug towards the proximal end of the void, whereby the third tissue plug is in contact with the second tissue plug, and the tissue graft in the cannula comprises the first tissue plug, the second tissue plug and the third tissue plug.

16. The method of claim 15, further comprising preparing each tissue plug in a cylindrical chamber of a loading device.

17. The method of claim 16, wherein the cylindrical chamber has a cross-sectional diameter smaller than the inner diameter of the cannula.

18. The method of claim 13 further comprising preparing the first tissue plug by loading and pressing a first tissue into the cylindrical chamber.

19. The method of claim 14, further comprising preparing the second tissue plug by loading and pressing a second tissue into the cylindrical chamber.

20. The method of claim 14, further comprising preparing each of the first tissue plug and the second tissue plug in a cylindrical chamber of a loading device, wherein the chamber has a surface finish of no more than 32 microinches root mean square (RMS).

* * * * *